US010120343B2

(12) United States Patent
Chiu et al.

(10) Patent No.: US 10,120,343 B2
(45) Date of Patent: Nov. 6, 2018

(54) TIME CORRECTIONS FOR DRILLING DATA

(71) Applicant: CONOCOPHILLIPS COMPANY, Houston, TX (US)

(72) Inventors: Stephen K. Chiu, Katy, TX (US); Phil D. Anno, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 199 days.

(21) Appl. No.: 15/151,901

(22) Filed: May 11, 2016

(65) Prior Publication Data

US 2016/0334542 A1 Nov. 17, 2016

Related U.S. Application Data

(60) Provisional application No. 62/160,871, filed on May 13, 2015.

(51) Int. Cl.
*G01D 15/00* (2006.01)
*G04G 7/00* (2006.01)
*G01V 1/40* (2006.01)

(52) U.S. Cl.
CPC ............... *G04G 7/00* (2013.01); *G01V 1/40* (2013.01); *G01V 2200/12* (2013.01)

(58) Field of Classification Search
CPC ........ G01V 1/28; G01V 1/30; G01V 2210/52; G01V 2210/67; G04G 7/00; G05B 15/02
See application file for complete search history.

(56) References Cited

U.S. PATENT DOCUMENTS

| 9,448,313 B2* | 9/2016 | Hofland ............... G01V 1/306 |
| 2006/0180439 A1 | 8/2006 | Foster |
| 2007/0239753 A1 | 10/2007 | Leonard |
| 2008/0137474 A1 | 6/2008 | Dashevskiy |

(Continued)

FOREIGN PATENT DOCUMENTS

WO       2014035732       3/2014

OTHER PUBLICATIONS

International Search Report for parent case, App. No. PCT/US2016/031791, dated Aug. 18, 2016.

(Continued)

*Primary Examiner* — Elias Desta
(74) *Attorney, Agent, or Firm* — ConocoPhillips Company

(57) ABSTRACT

The invention relates to a method, system and apparatus for synchronizing the time of time series data acquired from a wellbore sensor relative to a reference time series. This comprises acquiring a first time series from a sensor in a wellbore, acquiring a reference time series and determining a linear moveout time correction to apply to the first time series. The linear moveout time correction is equal to the depth of the wellbore sensor divided by the signal propagation velocity. The linear moveout correction is applied to the first time series. The first time series is cross-correlated with the reference time series to determine a cross-correlation time correction to apply to the first time series and the cross-correlation time correction is applied to the first time series to obtain a cross-correlation corrected time series. Dynamic time warping and dynamic cross-correlation may be used to adjust for clock drift.

21 Claims, 8 Drawing Sheets

(56) References Cited

U.S. PATENT DOCUMENTS

2013/0265851 A1* 10/2013 Faber ................ G01V 1/42
367/25

OTHER PUBLICATIONS

International Search Report for parent case, App. No. PCT/US2016/031805, dated Aug. 18, 2016.
Driscoll, 33. Deconvolving Water-Gun Seismic Data. in: Proceedings of the Ocean Drilling Program, Scientific Results. 1991.

* cited by examiner

TIME CORRECTIONS FOR DRILLING DATA

CROSS-REFERENCE TO RELATED APPLICATIONS

This application is a non-provisional application which claims benefit under 35 USC § 119(e) to U.S. Provisional Application Ser. No. 62/160,871 filed May 13, 2015, entitled "TIME CORRECTIONS FOR DRILLING DATA," which is incorporated herein in its entirety.

STATEMENT REGARDING FEDERALLY SPONSORED RESEARCH OR DEVELOPMENT

None.

FIELD OF THE INVENTION

The present invention relates generally to acquisition of signals associated with drilling wells for hydrocarbons. More particularly, but not by way of limitation, embodiments of the present invention include adjusting acquired signals received during drilling operation so that all signals are synchronous in time relative to a common reference time.

BACKGROUND OF THE INVENTION

Hydrocarbon reservoirs are developed with drilling operations using a drill bit associated with a drill string rotated from the surface or using a downhole motor, or both using a downhole motor and also rotating the string from the surface. A bottom hole assembly (BHA) at the end of the drill string may include components such as drill collars, stabilizers, drilling motors and logging tools, and measuring tools. A BHA is also capable of telemetering various drilling and geological parameters to the surface facilities.

Resistance encountered by the drill string in a wellbore during drilling causes significant wear on drill string, especially often the drill bit and the BHA. Understanding how the geometry of the wellbore affects resistance on the drill string and the BHA and managing the dynamic conditions that lead potentially to failure of downhole equipment is important for enhancing efficiency and minimizing costs for drilling wells. Various conditions referred to as drilling dysfunctions that may lead to component failure include excessive torque, shocks, bit bounce, induced vibrations, bit whirl, stick-slip, among others. These conditions must be rapidly detected so that mitigation efforts are undertaken as quickly as possible, since some dysfunctions can quickly lead to tool failures.

Downhole drilling dysfunctions can cause serious operational problems that are difficult to detect or predict. The more rapidly and efficiently drilling dysfunctions are identified the more quickly they may be mitigated. Thus a need exists for efficient methods, systems and apparatuses to quickly identify and to mitigate dysfunctions during drilling operations. Rapid aggregation and analysis of data from multiple sources associated with well bore drilling operations facilitates efficient drilling operations by timely responses to drilling dysfunctions.

Accurate timing information for borehole or drill string time-series data acquired with down hole sensors are important for aggregating information from surface and down hole sensors. However, each sensor may have its own internal clock or data from many sensors may be acquired and recorded relative to multiple clocks that are not synchronized. This non-synchronization of the timing information creates problems when combining and processing data from various sensors. Additionally, sensor timing is known sometimes to be affected by various environmental factors that cause variable timing drift that may differentially impact various sensors. Many factors may render inaccurate the timing of individual sensors that then needs to be corrected or adjusted so the data may be assimilated correctly with all sensor information temporally consistent in order to accurately inform a drilling operations center about the dynamic state of the well being drilled.

Therefore, there is a need for improved methods, systems and apparatuses for the accurate adjustment of timing for sensors in downhole environments.

BRIEF SUMMARY OF THE DISCLOSURE

It should be understood that, although an illustrative implementation of one or more embodiments are provided below, the various specific embodiments may be implemented using any number of techniques known by persons of ordinary skill in the art. The disclosure should in no way be limited to the illustrative embodiments, drawings, and/or techniques illustrated below, including the exemplary designs and implementations illustrated and described herein. Furthermore, the disclosure may be modified within the scope of the appended claims along with their full scope of equivalents.

The invention more particularly includes in one or more nonlimiting embodiments a process for adjusting the timing information of time series data acquired from a wellbore sensor relative to a reference time series. The process comprises acquiring a first time series from a sensor in a wellbore, acquiring a reference time series and determining a linear moveout time correction to apply to the first time series. The linear moveout time correction is equal to the depth of the wellbore sensor divided by the signal propagation velocity or drill string. The linear moveout correction is applied to the first time series. The first time series after linear moveout correction is cross-correlated with the reference time series to determine a cross-correlation time correction and the cross-correlation time correction is applied to the first time series to obtain a cross-correlation corrected time series.

In another nonlimiting embodiment, a set of application program interfaces is embodied on a computer readable medium for execution on a processor in conjunction with an application program for applying a time adjustment for a wellbore sensor time series relative to a reference time series comprising a first time series interface that receives a first time series from a wellbore sensor, a reference time series interface that receives a reference time series and a linear moveout correction interface for determining a linear moveout time correction to apply to the first time series. The linear moveout correction is equal to the wellbore sensor depth divided by a signal propagation velocity, which may be the velocity of steel pipe, drill string or the velocity of a signal through a conductor of wired pipe. A linear moveout correction application interface applies the linear moveout correction to the first time series. A cross-correlation interface cross-correlates the first time series with the reference time series to determine a cross-correlation time correction to apply to the first time series. A cross-correlation time correction interface applies the cross-correlation time correction to the first time series.

In still another embodiment a system for determining a time adjustment for a wellbore sensor time series relative to a reference time series where the system comprises a first time series acquired from a sensor in a wellbore, a reference time series and a computer comprising a memory and a processor. A moveout correction computer program module is stored in the memory for determining a moveout correction for the first time series, the moveout correction equal to the depth of the wellbore sensor associated with the first time series divided by a signal propagation velocity, which may be the velocity of steel pipe or the velocity of a signal through a conductor of wired pipe. A moveout correction application computer program module is stored in the memory for applying the moveout correction to the first time series to obtain moveout corrected time series. A cross-correlation computer program module is stored in the memory for cross-correlating the first time series with the reference time series to determine a cross-correlation correction to apply to the first time series. A cross-correlation correction application computer program module is stored in the memory for applying the cross-correlation correction to the first time series.

In still a further embodiment an apparatus for adjusting a time series from a wellbore sensor relative to a reference time series comprises a wellbore sensor associated with a drill string in a wellbore for acquiring a first time series, a surface sensor for acquiring a reference time series and a first computer program module for determining a linear moveout time offset adjustment to apply to the first time series. The linear moveout time offset adjustment is equal to the depth divided by the signal propagation velocity. A second computer program module applies the linear moveout time offset adjustment to the first time series. A third computer program module cross-correlates the first time series with the reference time series to determine a cross-correlation offset time to apply to the first time series. A fourth computer program module applies the cross-correlation offset time adjustment to the first time series.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The following examples of certain embodiments of the invention are given. Each example is provided by way of explanation of the invention, one of many embodiments of the invention, and the following examples should not be read to limit, or define, the scope of the invention.

Figure 1:
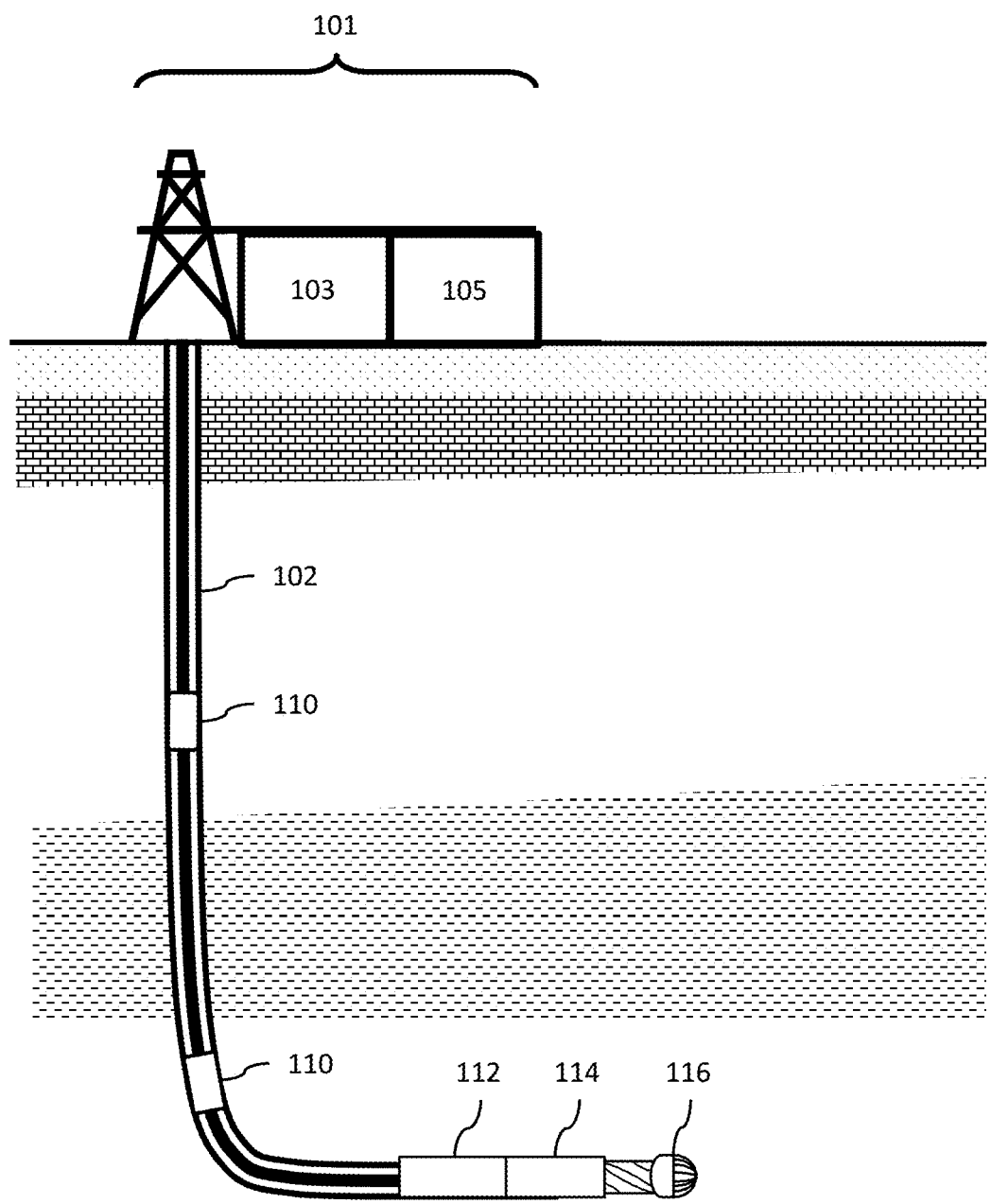
FIG. 1 illustrates an example of a subterranean formation with a wellbore according to various embodiments of the present disclosure.

FIG. 1 illustrates an example of a subterranean formation with a wellbore according to various embodiments of the present disclosure. The various embodiments disclosed herein are used in the well drilling environment as illustrated in FIG. 1 wherein a well bore 102 is drilled from surface drilling rig facilities 101 comprising a drilling rig, drill string associated sensors, 103, for example an electronic acoustic receiver attached on the kelly and associated control and supporting facilities, 105, which may include data aggregation and data processing infrastructure as well as drill rig control facilities. During drilling operations the well bore 102 includes a drill string comprising a bottom hole assembly (BHA) that may include a mud motor 112, an adjustable bent housing or 'BHA Dynamic Sub' 114 containing various sensors and electronic components and a drill bit 116. The BHA Dynamic Sub acquires time series data such as RPM, torque, bending moment, tension, pressure (ECS) and vibration data. Additionally, it acquires MWD/LWD data in high fidelity or standard modes, such as inclination, azimuth, gamma ray, resistivity and other advanced LWD data. Any data acquired with the BHA may be transmitted to the drilling rig 101 through drill string telemetry or through mud-pulse telemetry as time series data.

The drill string may also contain associated sensors, for example mid-string dynamic subs 110 that acquire high fidelity data such as RPM, torque, bending moment, tension and vibration data, and these instrumented subs can send signals representing these measurements up the drill string where they are recorded on or near the drilling rig. In addition, the drill string in a well bore 102 may be associated with a surface based sensor 103 for acquiring time series data associated with the drill string, which may be high frequency or low-frequency data, such as RPM, torque, weight-on-bit (WOB), acceleration data, etc.

Low-frequency surface data, such as RPM, torque, and acceleration data, are routinely used to detect and mitigate drilling dysfunctions. Recent developments in recording high-frequency surface as well as downhole data adds a new dimension of big data to better understand drilling dysfunctions. Complex Event Processing (CEP) is becoming possible through data acquisition and processing capabilities that are now being developed. Real time analytics are possible when tool motion and dysfunction indices are analyzed during drilling operations using signal processing, vibration analysis, CEP and feedback loops to rig controls. This leads to efficient acquisition of downhole tool wear indices through monitoring and prediction, which allows for optimized utilization and preventive maintenance on all parts of the string. This also allows for an effectively continuous understanding of downhole conditions, resulting in an efficiently constructed wellbore that is optimized for completions.

The continuous real time acquisition of multiple data streams of conventional and brand new data types allows for new analytic measures for each direct time series as well as the combinations of these data together as rapidly and efficiently as possible. How these measurements change over time and how each measurement data stream changes relative to other data streams provides new analytic tools for the understanding of the drill string dynamics and wellbore conditions.

Proper merging of data is integral to understanding CEP and creating rules or learnings applicable to dynamic drilling operations and responding appropriately in real time. This merging, comparison and analysis of data is impaired, and valuable operational analysis time may be lost, when different data types are not synchronized to the same reference time.

The drilling industry has a need to optimize downhole data acquisition operations that properly synchronize or correct timing differences between various time series measurements. Considerable efforts in manual operations are used in the field to synchronize or adjust time differences between surface and downhole sensors. However, these manual time-adjustment operations are not just slow, they are known to open up potential human errors during the field data acquisition phase.

For example, each sensor may have its own internal clock. In an ideal world, the field operation is able to synchronize the clocks of all surface and downhole sensors simultaneously to ensure that each clock starts at the same time and/or all time differences are known. However, in practice, the synchronization is not done during field operations. A surface sensor often does not synchronize or cannot be synchronized with downhole sensors, or the clocks of downhole sensors start at different time. This non-synchronization of the clocks creates time misalignment between surface and downhole measurements. This timing error may range from minutes to hours.

Another major source of timing error relates to clock drift of each sensor where a sensor associated clock or timer does not run at the same speed compared to another clock. That is, after some time the clock "drifts apart" in time from the other clock. The timing of various sensors may drift relative to other timing devices for any number of reasons, including physical composition, temperature, pressure, power variations and timer quality. Timing drift may vary at different rates arbitrarily. The timing error of the clock drift may range from seconds to minutes.

To correct the timing error due to the non-synchronization of the clocks, the drilling industry often employs a manual method to correlate downhole data to surface data, assuming surface data to be a reference signal because surface data are always available, usually convenient to use and synchronize with a main clock, therefore it is often most convenient to use a surface associated clock as a reference signal. However, the manual method is labor-intensive, error prone, and less accurate depending on a person's judgment and preferences. Since the clock drift is difficult to determine manually, the drilling industry frequently ignores or approximates this correction.

To avoid the manual corrections of timing errors, embodiments disclosed herein provide automatic methods of one or several steps to correct time misalignments among surface and downhole data. After the corrections, all the measurements are represented correctly relative to a reference clock, and therefore all measurements are substantially synchronized in time. Substantially synchronized in time will be understood to mean within one or two standard deviations of the measurement error. This facilitates easy and accurate comparisons among all sensors and data sets. The application of time adjustments consists of three key corrections: 1) correcting for the non-synchronization of the clocks based on cross-correlation method, 2) correcting for clock drift based on a dynamic cross-correlation method or a dynamic time warping method, and 3) travel-time path correction between surface and downhole sensors based on a "linear moveout correction." The benefits of this multistep application give accurate corrections of timing errors and drastically speed up the processing time, which avoids labor-intensive and error-prone methods currently employed in the drilling industry. After the corrections, all the measurements are represented correctly relative to a reference clock.

The following outlines the framework for automatic corrections of timing errors needed to compensate downhole data. There are numerous time-shift methods that can be applied to compute the time corrections. For example, it may be preferable to initially use a time-shift method based on cross-correlation. In signal processing, cross-correlation is a measure of similarity of two waveforms as a function of a time-lag that gives a measure of time adjustment that may be applied to one of them. For discrete real time series of $f(t)$ and $g(t)$, the cross-correlation is defined as (Oppenheim and Schafer, 1989; Telford, et al. 1976): $C(\tau)=\Sigma_{n=0}^{N}f(n\Delta t)*g(n\Delta t+\tau)$, where $C(\tau)$ denotes the cross-correlation function, $\tau$ is the displacement of $g(t)$ relative to $f(t)$, termed as the time lag, $\Delta t$ is the time sample rate, and n is a time sample index.

In some embodiments, the data segment utilizes a time interval to drill at least 2 stands of drill pipe. Each drill pipe is approximately 90 feet. It typically takes 3 to 5 hours to complete drilling 2 stands of drill pipe. Where there is a new addition of a drill pipe, the values of the time series normally reduce to zero, creating a step function. The cross-correlation of the time series that include those step functions gives an accurate and robust estimation of the time correction.

For example, $f(t)$ may correspond to surface data and $g(t)$ represents downhole data. A time shift is found by the maximum of the cross-correlating function of $C(\tau)$. The time shift is applied to all data to correct for non-synchronization of all clocks with the reference clock (typically a surface clock). As an example, the data length ($N\Delta t$) taken into the cross-correlation process may be about 3 to 5 hours at a time, but of course varies by the situation. This process is repeated until the end of the data set.

Figure 2:
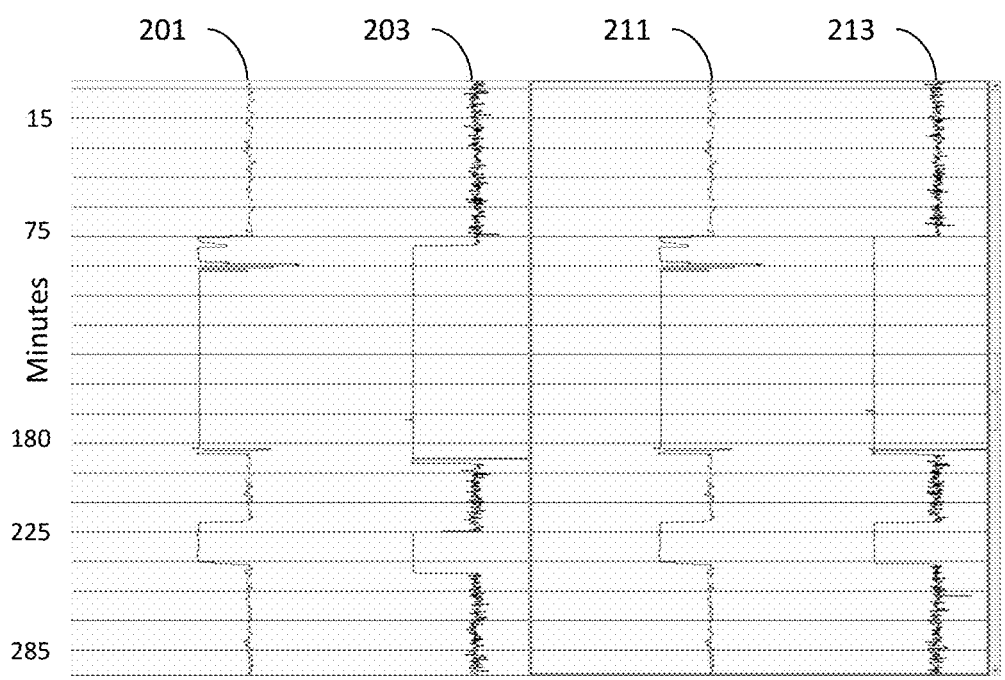
FIG. 2 illustrates an example of a time series before and after time correction of the data, with a surface clock as the reference.

FIG. 2 shows an example of time-series data before and after time correction of the data, with a surface clock as the reference. Time series 201 is transducer data representing Surface measured Revolutions per Minute (RPM) associated with a surface reference clock. Time series 203 is transducer data obtained from a sensor in the wellbore, associated with the drill string, also measuring RPM. An addition of a drill pipe occurs around 75 minutes showing an illustrated example of a step function. After applying cross-correlation as described, a time shift is obtained to be applied to adjust the time of the wellbore sensor RPM data to the surface time series associated reference time. Time series 211 is the same transducer RPM time series data 201 associated with a surface reference clock and time series 213 is the wellbore sensor RPM data after the time adjustment determined from cross-correlation has been applied.

Another method that may additionally be used to correct clock drift uses a dynamic cross-correlation method that is similar to the cross-correlation method. The key difference is the use of a smaller overlapped-time window to compute a time shift. For example, a typical window size for dynamic cross-correlation is 30 minutes with a 50 percent overlapped window; however, the overlap will be dependent on the situation and the amount of clock drift.

Figure 3:
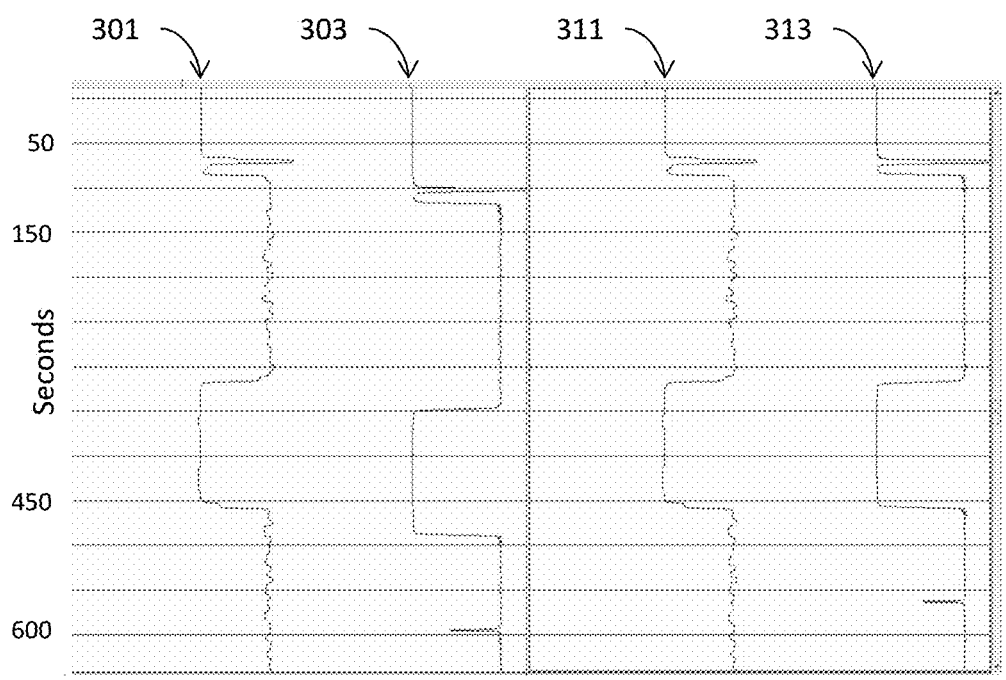
FIG. 3 illustrates an example before and after clock-drift correction of downhole data to a surface reference clock by the dynamic time warping method.

Another method to correct clock drift uses a dynamic time warping method (Hale, 2013) that computes a sample-by-sample time shift. This method can give excellent matches between surface and downhole measurements. FIG. 3 illustrates an example before and after clock-drift correction of downhole data to a surface reference clock by the dynamic time warping method. Time series 301 is transducer data representing a Surface measured RPM associated with a surface reference clock. Time series 303 is transducer data obtained from a sensor in the wellbore, associated with the drill string, also measuring RPM. After applying the dynamic time warping as described, a time shift series of adjustments is obtained to be applied to adjust the time of the wellbore sensor RPM data. Time series 311 is the same transducer RPM time series data 301 associated with a surface reference clock and time series 313 is the wellbore sensor RPM data after the time adjustment determined from cross-correlation has been applied.

Another time adjustment may be added because downhole-sensor locations vary in depth. For sensors associated with a drilling string, the linear moveout correction accounts for travel time in which the signal travels from one sensor location in depth to the next sensor and/or to the surface. The correction $\Delta T$ is computed as: $\Delta T=Z/V$, where Z is the distance from the downhole sensor location to surface, and V is the velocity of signal propagation, which may be the velocity of the steel pipe or the velocity of a signal through a conductor of wired pipe. The $\Delta T$ correction is dynamic and changes as the depth of the sensor increases.

Figure 4:
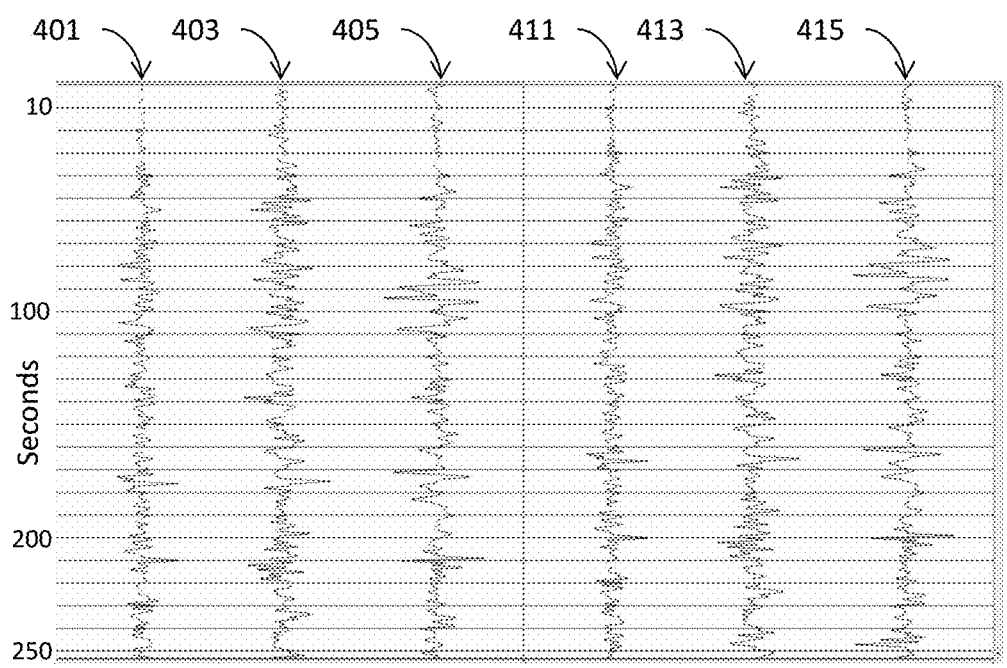
FIG. 4 illustrates an example before and after linear moveout correction of data acquired from downhole transducers.

FIG. 4 illustrates an example before and after linear moveout correction of data acquired from downhole transducers, in this case accelerometers. Time series 401, 403 and 405 are downhole acceleration time series data acquired from sensors in the wellbore, for example in or on the drill string. After application of the linear moveout time adjustment correction described, time series data 411, 413 and 415 are illustrated such that the data are substantially closer to synchronous in time relative to, for example, a surface associated reference time. Other time adjustments may be added after this linear moveout correction, such as the cross-correlation or time warp methods.

Figure 5:
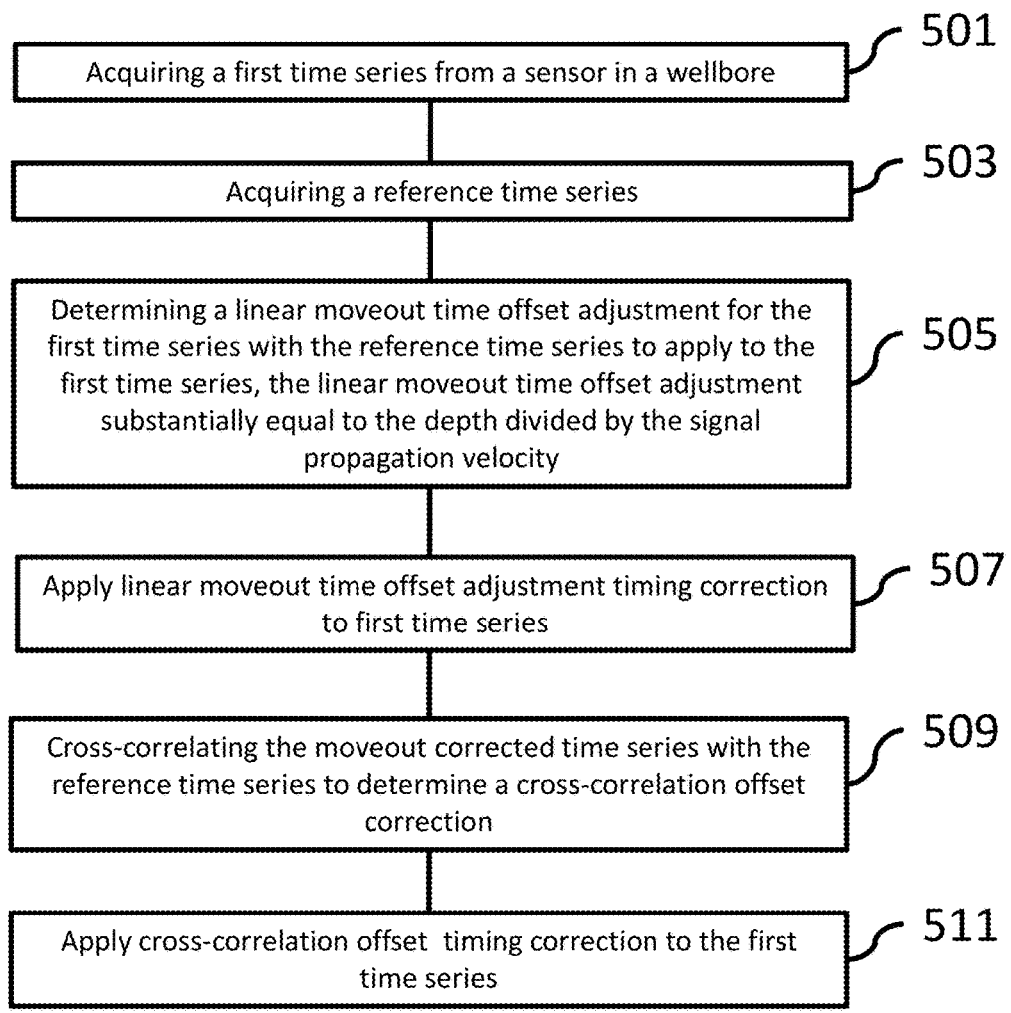
FIG. 5 illustrates a method according to embodiments of the present disclosure for automatically adjusting time series data relative to a reference time.

FIG. 5 illustrates a method according to embodiments of the present disclosure for automatically adjusting time series data relative to a reference time. A first time series is acquired from a downhole sensor 501. A reference time series is acquired, which may be acquired using a surface transducer related time series with a known relationship to a reference time 503. A linear moveout time series is determined to adjust the first time series due to the downhole sensors being variable in depth. The linear moveout time offset adjustment is equal to the depth of the downhole sensor divided by the signal propagation velocity 505. Then the linear moveout offset correction may be applied to the first time series 507. The first time series and the reference time series may be cross-correlated to determine a cross-correlation time offset correction to apply to the first time series 509, and the cross-correlation time offset correction is applied 511 to obtain a cross-correlation corrected time series.

Figure 6:
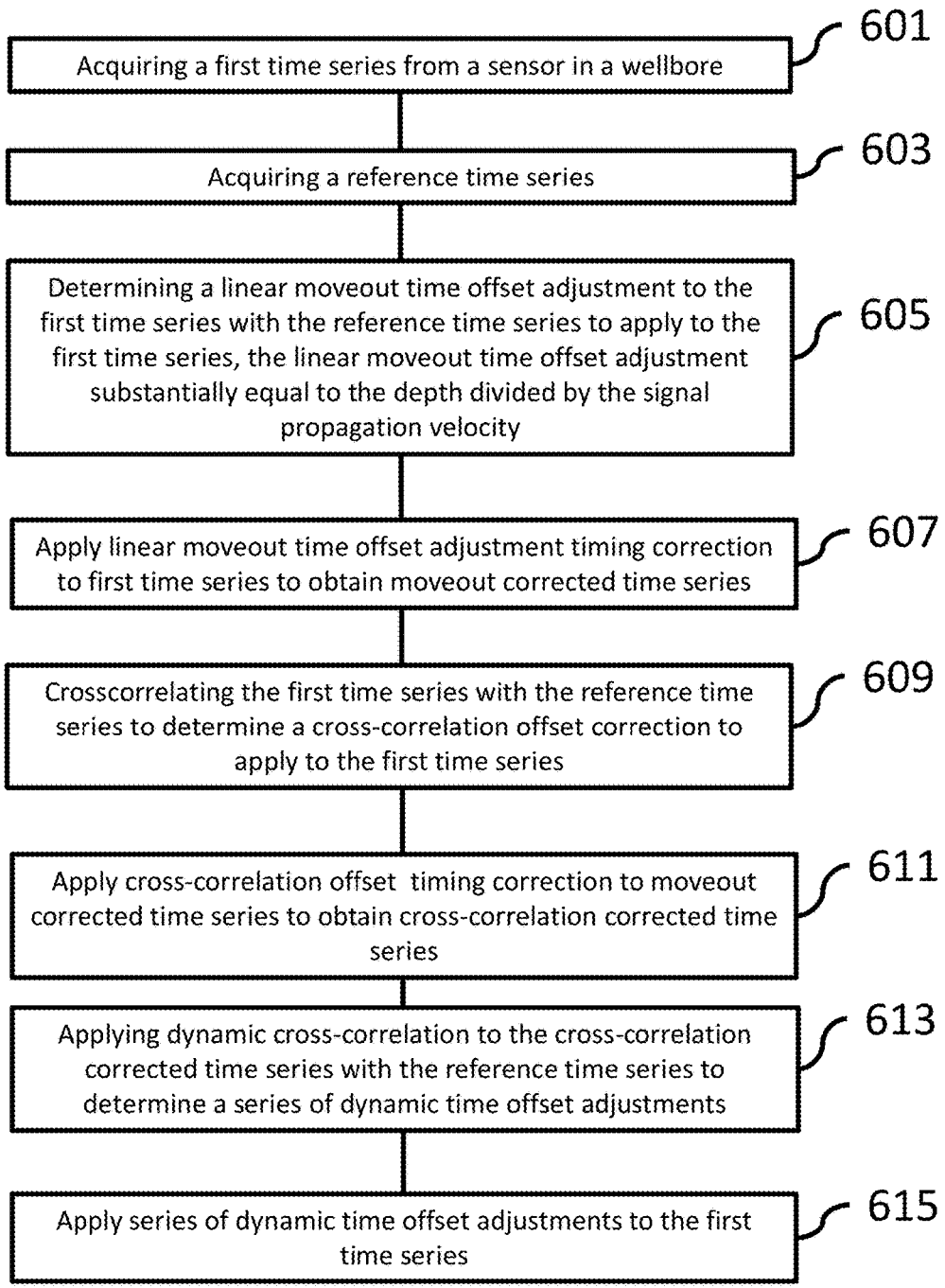
FIG. 6 illustrates a method according to alternative embodiments of the present disclosure for automatically adjusting time series data relative to a reference time.

FIG. 6 illustrates a method according to alternative embodiments of the present disclosure for automatically adjusting time series data relative to a reference time. A first time series is acquired from a downhole sensor 601. A reference time series is acquired, which may be acquired using a surface transducer related time series with a known relationship to a reference time 603. A linear moveout time series offset adjustment is determined to adjust the first time series due to the downhole sensors being variable in depth. The linear moveout time offset adjustment is equal to the depth of the downhole sensor divided by the signal propagation velocity or drill string 605. The linear moveout time offset adjustment is applied to the first time series to obtain a moveout corrected time series 607. The first time series and the reference time series are cross-correlated to determine a cross-correlation time correction to apply to the first time series 609. The cross-correlation time correction is applied to the first time series 611, to obtain a cross correlation corrected time series. To correct for clock-sensor drift, a dynamic cross-correlation may be applied to the first time series with the reference time series to obtain dynamic cross-correlation time offset adjustments to apply to the first time series 613. Alternatively, the dynamic time warping process may be used to determine adjustments to the data for clock drift. The dynamic cross-correlation time offset adjustments are applied to the cross-correlation corrected time series to obtain dynamically adjusted time series 615. In the case dynamic time warp adjustments were determined, they can be applied to the first time series.

Figure 7:
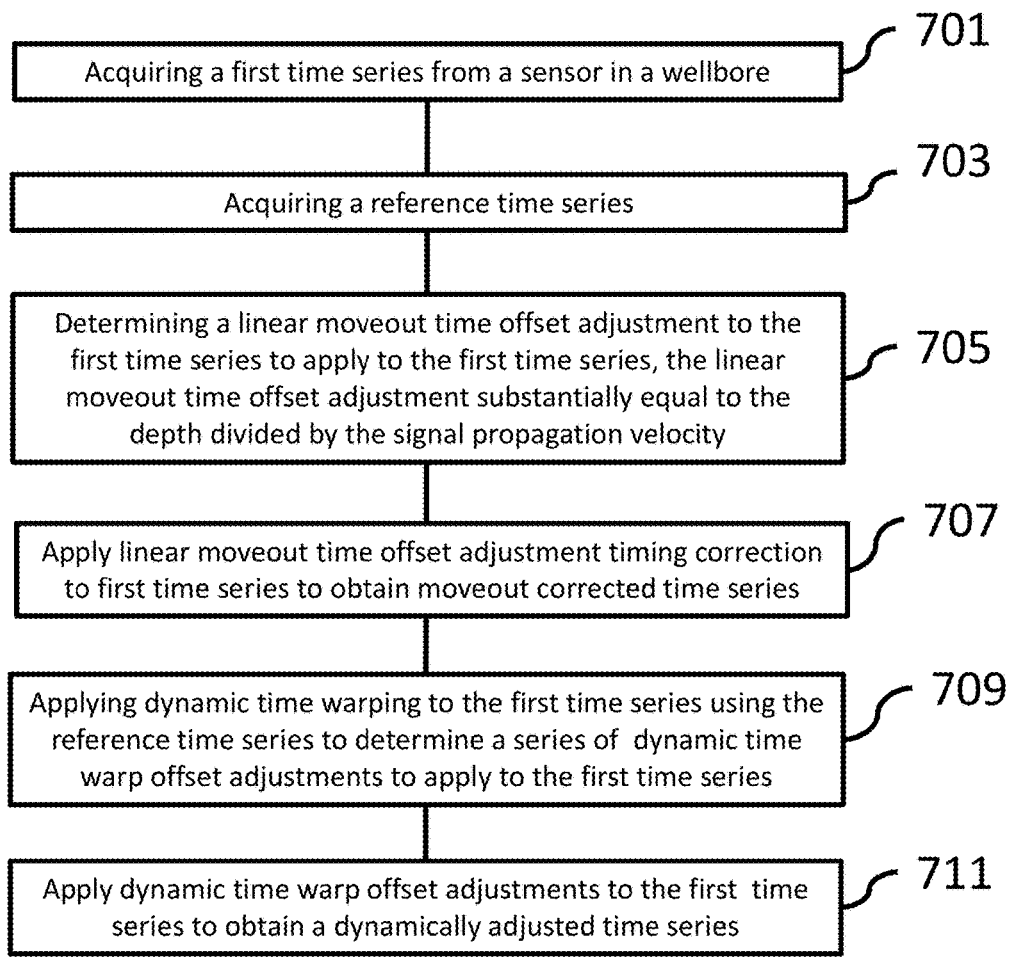
FIG. 7 illustrates a method according to further embodiments of the present disclosure for automatically adjusting time series data relative to a reference time.

FIG. 7 illustrates a method according to further embodiments of the present disclosure for automatically adjusting time series data relative to a reference time. A first time series is acquired from a sensor in a wellbore 701. A reference time series is acquired, which may be acquired using a surface transducer related time series with a known relationship to a reference time 703. A linear moveout time series offset adjustment is determined to adjust the first time series due to the downhole sensors being variable in depth. The linear moveout time offset adjustment is equal to the depth of the downhole sensor divided by the signal propagation velocity or drill string 705. The linear moveout time offset adjustment is applied to the first time series to obtain a moveout corrected time series 707. A dynamic time warping may be applied to the first time series with respect to the reference time series to determine a series of dynamic time warp offset adjustments to apply to the first time series 709. The series of dynamic time warp offset adjustments are then applied to the first time series to obtain a dynamically adjusted time series 711.

Figure 8:
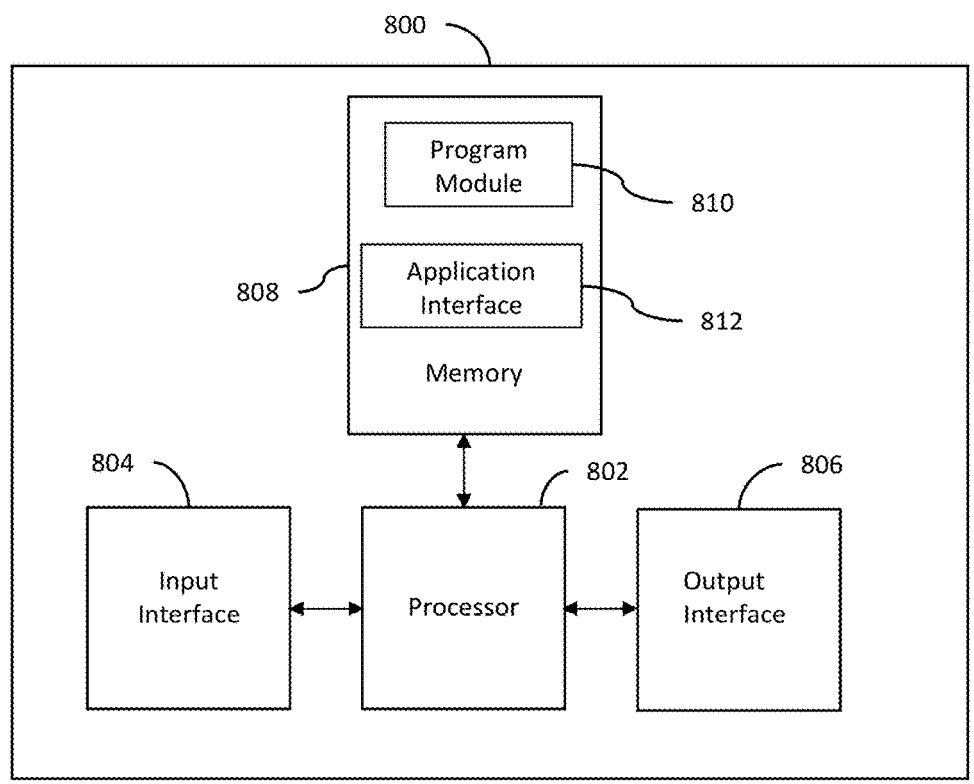
FIG. 8 illustrates a system or apparatus according to further embodiments of the present disclosure.

FIG. 8 is a schematic diagram of an embodiment of a system 800 that may correspond to or may be part of a computer and/or any other computing device, such as a workstation, server, mainframe, super computer, processing graph and/or database. The system 800 includes a processor 802, which may be also be referenced as a central processor unit (CPU). The processor 802 may communicate and/or provide instructions to other components within the system 800, such as the input interface 804, output interface 806, and/or memory 808. In one embodiment, the processor 802 may include one or more multi-core processors and/or memory (e.g., cache memory) that function as buffers and/or storage for data. In alternative embodiments, processor 802 may be part of one or more other processing components, such as application specific integrated circuits (ASICs), field-programmable gate arrays (FPGAs), and/or digital signal processors (DSPs). Although FIG. 8 illustrates that processor 802 may be a single processor, it will be understood that processor 802 is not so limited and instead may represent a plurality of processors including massively parallel implementations and processing graphs comprising mathematical operators connected by data streams. The processor 802 may be configured to implement any of the methods described herein.

FIG. 8 illustrates that memory 808 may be operatively coupled to processor 802. Memory 808 may be a non-transitory medium configured to store various types of data. For example, memory 808 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

As shown in FIG. 8, the memory 808 may be used to house the instructions for carrying out various embodiments described herein. In an embodiment, the memory 808 may comprise a computer program module 810 that may be accessed and implemented by processor 802. Alternatively, application interface 812 may be stored and accessed within memory by processor 802. Specifically, the program module or application interface may perform signal processing and/or conditioning of the time series data as described herein.

Programming and/or loading executable instructions onto memory 808 and processor 802 in order to transform the system 800 into a particular machine or apparatus that operates on time series data is well known in the art. Implementing instructions, real-time monitoring, and other functions by loading executable software into a computer can be converted to a hardware implementation by well-known design rules. For example, decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or application specific hardware that hardwires the instructions of the software. In the same manner as a machine controlled by a new ASIC is a particular machine or apparatus, likewise a computer that has been programmed and/or loaded with executable instructions may be viewed as a particular machine or apparatus.

In addition, FIG. 8 illustrates that the processor 802 may be operatively coupled to an input interface 804 configured to obtain the time series data and output interface 806 configured to output and/or display the results or pass the results to other processing. The input interface 804 may be configured to obtain the time series data via sensors, cables, connectors, and/or communication protocols. In one embodiment, the input interface 804 may be a network interface that comprises a plurality of ports configured to receive and/or transmit time series data via a network. In particular, the network may transmit the acquired time series data via wired links, wireless link, and/or logical links. Other examples of the input interface 804 may be universal serial bus (USB) interfaces, CD-ROMs, DVD-ROMs. The output interface 806 may include, but is not limited to one or more connections for a graphic display (e.g., monitors) and/or a printing device that produces hard-copies of the generated results.

In one nonlimiting embodiment a process for adjusting the time reference of time series data acquired from a wellbore sensor relative to a reference time series comprises acquiring a first time series from a sensor in a wellbore, acquiring a reference time series and determining a linear moveout time correction to apply to the first time series. The linear moveout time correction is equal to the depth of the wellbore sensor divided by the signal propagation velocity or drill string. The linear moveout correction is applied to the first time series. The first time series is cross-correlated with the reference time series to determine a cross-correlation time correction to apply to the first time series and the cross-correlation time correction is applied to the first time series to obtain a cross-correlation corrected time series.

Other aspects include determining a dynamic cross-correlation correction with the reference time series to apply to the first time series. The dynamic cross-correlation time correction is applied to the first time series. A dynamic time warp series of time corrections may be determined with reference to the reference time series. The dynamic time warp series of time corrections may be applied to the first time series. A crosscorrelation may be applied to the reference time series with first time series during a period of drilling that includes new drill pipe added to the drill string. This results in a robust estimate of the time difference between the time series.

In another nonlimiting embodiment, a set of application program interfaces is embodied on a computer readable medium for execution on a processor in conjunction with an application program for applying a time adjustment for a wellbore sensor time series relative to a reference time series comprising a first time series interface that receives a first time series from a wellbore sensor, a reference time series interface that receives a reference time series and a linear moveout correction interface for determining a linear moveout time correction to apply to the first time series. The linear moveout correction is equal to the wellbore sensor depth divided by a signal propagation velocity, which may be the velocity of steel pipe or drill string or the velocity of a signal through a conductor of wired pipe. A linear moveout correction application interface applies the linear moveout correction to the first time series. A cross-correlation interface cross-correlates the first time series with the reference time series to determine a cross-correlation time correction to apply to the first time series. A cross-correlation time correction interface applies the cross-correlation time correction to the first time series.

In other aspects the set of application interface programs may further comprise a dynamic cross-correlation interface to determine a dynamic cross-correlation time correction to apply to the first time series. A dynamic cross-correlation time correction application interface may apply the dynamic cross-correlation time correction to the first time series. A dynamic time warp interface may determine a dynamic time warp series of time corrections to apply to the first time series relative to the reference time series. A dynamic time warp application interface may apply the dynamic time warp series of time corrections to the first time series.

In still another embodiment a system for determining a time adjustment for a wellbore sensor time series relative to a reference time series where the system comprises a first time series acquired from a sensor in a wellbore, a reference time series and a computer comprising a memory and a processor. A moveout correction computer program module is stored in the memory for determining a moveout correction for the first time series, the moveout correction equal to the depth of the wellbore sensor associated with the first time series divided by a signal propagation velocity, which may be the velocity of steel pipe or the velocity of a signal through a conductor of wired pipe. A moveout correction application computer program module is stored in the memory for applying the moveout correction to the first time series to obtain moveout corrected time series. A cross-correlation computer program module is stored in the memory for cross-correlating the first time series with the reference time series to determine a cross-correlation correction to apply to the first time series. A cross-correlation correction application computer program module is stored in the memory for applying the cross-correlation correction to the first time series.

In other aspects the system further comprises a dynamic cross-correlation module that determines a dynamic cross-correlation adjustment of the first time series with the reference time series to apply to the first time series. A dynamic cross-correlation time-correction application computer program module to apply the dynamic cross-correlation time correction to the first time series. A dynamic time warping computer program module may determine a dynamic time warp series of time offset adjustments to apply to the first time series. A dynamic time warping correction application computer module may apply the dynamic time warp series of time offset adjustments to the first time series.

In still a further embodiment an apparatus for adjusting a time series from a wellbore sensor relative to a reference time series comprises a wellbore sensor associated with a drill string in a wellbore for acquiring a first time series, a surface sensor for acquiring a reference time series and a first computer program module for determining a linear moveout time offset adjustment to apply to the first time series. The linear moveout time offset adjustment is equal to the depth divided by the signal propagation velocity. A second computer program module applies the linear moveout time offset adjustment to the first time series. A third computer program module cross-correlates the first time series with the reference time series to determine a cross-correlation time to apply to the first time series. A fourth computer program module applies the cross-correlation time adjustment to the first time series.

In other aspects the apparatus may further comprise a dynamic time warp correction module for determining a series of time warp adjustments for application to the first time series relative to the reference time series. A dynamic time warp application module may apply the series of time warp adjustments to the first time series. A dynamic cross-correlation correction module may determine a series of time warp adjustments for application to the first time series relative to the reference time series. A dynamic cross-correlation application module may apply the series of time warp adjustments to the first time series.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for adjusting a time reference of time series data acquired from a wellbore sensor relative to a reference time series where the process comprises:
   a. acquiring a first time series from a sensor of a drill string in a wellbore during a drilling operation;
   b. acquiring a reference time series;
   c. determining a linear moveout time correction to apply to the first time series, the linear moveout time correction equal to a depth of the sensor divided by a signal propagation velocity;
   d. applying the linear moveout time correction to the first time series;
   e. cross-correlating the first time series with the reference time series to determine a cross-correlation time correction to apply to the first time series;
   f. applying the cross-correlation time correction to the first time series to obtain a cross-correlation corrected time series;
   g. displaying the cross-correlation corrected time series via an output interface during the drilling operation; and
   h. monitoring and identifying a dysfunction of the drill string during the drilling operation using the cross-correlation corrected time series.

2. The process of claim 1 further comprising:
determining a dynamic cross-correlation time correction with the reference time series to apply to the first time series.

3. The process of claim 2 wherein the dynamic cross-correlation time correction is applied to the first time series.

4. The process of claim 1 further comprising:
determining a dynamic time warp series of time corrections to apply to the first time series with the reference time series.

5. The process of claim 4 wherein the dynamic time warp series of time corrections are applied to the first time series.

6. The process of claim 1 wherein the cross-correlation time correction is applied to the reference time series with the first time series during a period of drilling that includes a new addition of drill pipe to the drill string.

7. A set of application program interfaces embodied on a computer readable medium for execution on a processor in conjunction with an application program for applying a time adjustment for a wellbore sensor time series relative to a reference time series comprising:
   a first time series interface that receives a first time series from a wellbore sensor of a drill string during a drilling operation;
   a reference time series interface that receives a reference time series;
   a linear moveout correction interface for determining a linear moveout time correction to apply to the first time series, the linear moveout time correction equal to a depth of the wellbore sensor divided by a signal propagation velocity;

a linear moveout correction application interface that applies the linear moveout time correction to the first time series;
a cross-correlation interface that cross-correlates the first time series with the reference time series to determine a cross-correlation time correction to apply to the first time series;
a cross-correlation time correction interface to apply the cross-correlation time correction to the first time series to obtain a cross-correlation corrected time series; and
an output interface to display the cross-correlation corrected time series during the drilling operation for monitoring and identifying a dysfunction of the drill string during the drilling operation using the cross-correlation corrected time series.

8. The set of application program interfaces according to claim 7 further comprising:
a dynamic cross-correlation interface to determine a dynamic cross-correlation time correction to apply to the first time series.

9. The set of application program interfaces according to claim 8 further comprising:
a dynamic cross-correlation time correction application interface to apply the dynamic cross-correlation time correction to the first time series.

10. The set of application program interfaces according to claim 7 further comprising:
a dynamic time warp interface for determining a dynamic time warp series of time corrections to apply to the first time series relative to the reference time series.

11. The set of application program interfaces according to claim 10 further comprising:
a dynamic time warp application interface for applying the dynamic time warp series of time corrections to the first time series.

12. A system for determining a time adjustment for a wellbore sensor time series relative to a reference time series where the system comprises:
  a. a first time series acquired from a sensor of a drill string in a wellbore during a drilling operation;
  b. a reference time series;
  c. a computer comprising a memory and a processor;
  d. a moveout correction computer program module stored in the memory for determining a moveout correction for the first time series, the moveout correction equal to a depth of the sensor associated with the first time series divided by a signal propagation velocity;
  e. a moveout correction application computer program module stored in the memory for applying the moveout correction to the first time series to obtain a moveout corrected time series;
  f. a cross-correlation computer program module stored in the memory for cross-correlating the first time series with the reference time series to determine a cross-correlation correction to apply to the first time series;
  g. a cross-correlation correction application computer program module stored in the memory for applying the cross-correlation correction to the first time series to obtain a cross-correlation corrected time series; and
  h. an output interface to display the cross-correlation corrected time series during the drilling operation for monitoring and identifying a dysfunction of the drill string during the drilling operation using the cross-correlation corrected time series.

13. The system of claim 12 further comprising:
a dynamic cross-correlation module that determines a dynamic cross-correlation time correction of the first time series with the reference time series to apply to the first time series.

14. The system of claim 13 further comprising:
a dynamic cross-correlation time-correction application computer program module wherein the dynamic cross-correlation module applies the dynamic cross-correlation time correction to the first time series.

15. The system of claim 12 further comprising:
a dynamic time warping computer program module for determining a dynamic time warp series of time offset adjustments to apply to the first time series.

16. The system of claim 15 further comprising:
a dynamic time warping correction application computer module that applies the dynamic time warp series of time offset adjustments to the first time series.

17. An apparatus for adjusting a time series from a wellbore sensor relative to a reference time series where the apparatus comprises:
  a. a wellbore sensor associated with a drill string in a wellbore for acquiring a first time series during a drilling operation;
  b. a surface sensor for acquiring a reference time series;
  c. a computer comprising a memory and a processor;
  d. a first computer program module for determining a linear moveout time offset adjustment to apply to the first time series, the linear moveout time offset adjustment equal to a depth divided by a signal propagation velocity;
  e. a second computer program module to apply the linear moveout time offset adjustment to the first time series;
  f. a third computer program module for cross-correlating the first time series with the reference time series to determine a cross-correlation time to apply to the first time series;
  g. a fourth computer program module for applying the cross-correlation time to the first time series to obtain a cross-correlation corrected time series; and
  h. an output interface to display the cross-correlation corrected time series during the drilling operation for monitoring and identifying a dysfunction of the drill string during the drilling operation using the cross-correlation corrected time series.

18. The apparatus of claim 17 further comprising:
a dynamic time warp correction module for determining a series of time warp adjustments for application to the first time series relative to the reference time series.

19. The apparatus of claim 18 further comprising:
a dynamic time warp application module for applying the series of time warp adjustments to the first time series.

20. The apparatus of claim 17 further comprising:
a dynamic cross-correlation correction module for determining a series of time warp adjustments for application to the first time series relative to the reference time series.

21. The apparatus of claim 20 further comprising:
a dynamic cross-correlation application module for applying the series of time warp adjustments to the first time series.

* * * * *